United States Patent [19]

Kasugai et al.

[11] Patent Number: 5,279,439
[45] Date of Patent: Jan. 18, 1994

[54] FUEL CAP FOR A PRESSURED FUEL TANK

[75] Inventors: Joji Kasugai; Hiroyuki Hagano; Natsushi Miura; Norimichi Kubota, all of Aichi, Japan

[73] Assignee: Toyoda Gosei Co., Ltd., Nishikasugai, Japan

[21] Appl. No.: 45,698

[22] Filed: Apr. 14, 1993

[30] Foreign Application Priority Data

Apr. 27, 1992 [JP] Japan .................. 4-107967
Jul. 31, 1992 [JP] Japan .................. 4-224638

[51] Int. Cl.$^5$ ............................... B65D 51/16
[52] U.S. Cl. ................... 220/203; 220/303; 220/DIG. 33; 137/526
[58] Field of Search ............... 220/203, 303, 366, 374, 220/89.1, DIG. 33; 137/511, 516.11, 526

[56] References Cited

U.S. PATENT DOCUMENTS

| | | | |
|---|---|---|---|
| 4,494,673 | 1/1985 | Hiraishi | 220/288 |
| 4,588,102 | 5/1986 | Kasugai | 220/203 |
| 4,666,056 | 5/1987 | Kasugai et al. | |
| 4,726,488 | 2/1988 | Kasugai | 220/203 |
| 4,779,755 | 10/1988 | Harris | 220/203 |
| 4,787,529 | 11/1988 | Harris | 220/203 |
| 5,020,685 | 6/1991 | Sato et al. | 220/203 |
| 5,148,934 | 9/1992 | Kasugai et al. | 220/203 |
| 5,183,173 | 2/1993 | Heckman | 220/367 |
| 5,203,466 | 4/1993 | Kasugai et al. | 220/209 |

FOREIGN PATENT DOCUMENTS 424845 6/1992 Japan .

Primary Examiner—Allan N. Shoap
Assistant Examiner—Stephen K. Cronin
Attorney, Agent, or Firm—Cushman, Darby & Cushman

[57] ABSTRACT

A fuel cap is provided to improve sealing characteristics of a pressurized fuel tank. When the inner pressure P of a fuel tank is a negative pressure less than a predetermined regulation negative pressure Pr which does not need to be controlled, a valve 160 is pressed upward by the urging force of a spring 164 to bring a lip portion 161 of the valve 160 into contact with a seal surface 156 of a seal body 150 to thereby close the valve 160. As a result, the fuel tank is sealed from the outside air. At this time, a flat plate portion 155 of the rubber-made seal body 150 is bent by the urging force of the spring 164 so that the gap L between the flat plate portion 155 and the lower surface of a ceiling plate portion 131 is narrowed. In addition, the divergence of center of the valve 160 with respect to the seal body 50 is limited by ribs 162 of the valve 160 located in a valve slide hole 135.

4 Claims, 5 Drawing Sheets

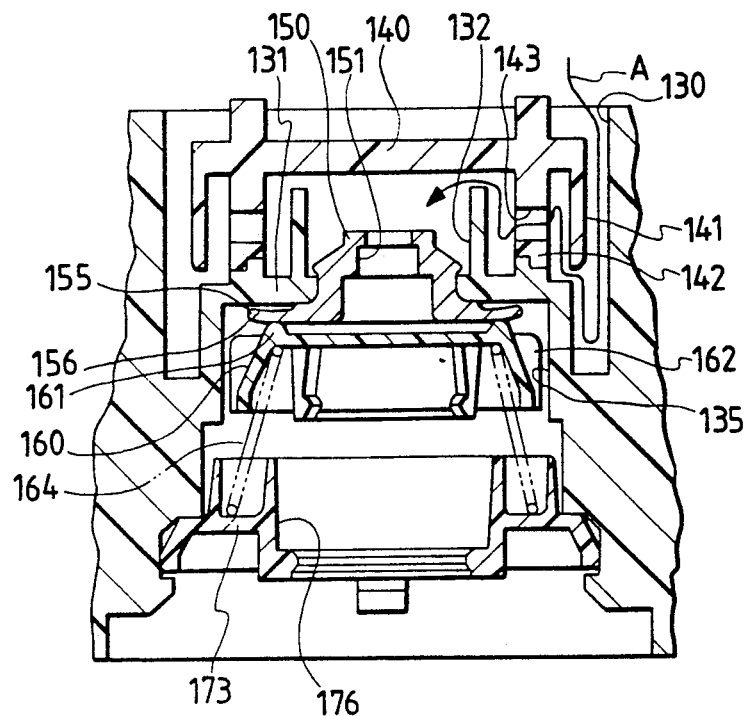

FUEL CAP FOR A PRESSURED FUEL TANK

BACKGROUND OF THE INVENTION

The present invention relates to a fuel cap (hereinafter simply called cap) attached to a filler neck of a fuel tank of an automobile and, particularly, relates to a fuel cap having a negative pressure valve permitting air to flow from the outside of a fuel tank to the inside thereof at the time of lowering of the inner pressure of the fuel tank to prevent the inner pressure of the fuel tank from lowering further.

A cap of this type is described in Japanese Utility Model Unexamined Publication No. Sho-63-86481 for preventing dust or the like mixed in flowing-in air at the time of operation of the valve from depositing on the negative pressure valve.

In the cap described in the aforementioned Publication, a dust proof plate is arranged in an air passage up to the negative pressure valve to alter the flow of air and make the dust mixed in the air fall, to thereby obtain an effect of being dust proof.

In the cap described in the above Publication, however, there is still room for improvement in the durability of the dust proof effect, because the space of the place where the fallen dust can deposit is small.

SUMMARY OF THE INVENTION

The present invention has an object to provide a cap improved in the dust proof durability and improved in the dust proof effect.

According to the present invention, a cap is provided with a closure including a cylindrical portion attached, at its lower part, to a filler neck of a fuel tank, and a ceiling plate portion having a passage hole and being arranged so as to block the inner circumference of the cylindrical portion substantially at a vertical middle position of the cylindrical portion.

A negative pressure valve is arranged just under the passage hole of the ceiling plate portion so that the valve is actuated to operate at the time of flowing of air into the cylindrical portion.

A dust proof plate is arranged at the periphery of the passage hole on the upper side of the ceiling plate portion.

A flange portion extending outwardly is formed at the upper part of the cylindrical portion of the closure.

A shell is attached to the flange portion so as to cover the upper part of the closure in a manner so that an air passage for the air is formed between the flange portion and the shell.

The ceiling plate portion has a convex portion which makes the periphery of the passage hole project upwardly to thereby form a first annular dust reservoir concave portion between the ceiling plate portion and the inner circumferential surface of the cylindrical portion, and has a first cylindrical dam plate portion extending upward from the periphery of the passage hole.

The dust proof plate has a base plate portion to cover the upper part of the convex portion, and has a second cylindrical dam plate portion extending from the outer circumferential edge of the base plate portion to the vicinity of the outer circumferential edge of the convex portion.

A third cylindrical dam plate portion is formed between the first dam plate portion and the second dam plate portion so as to vertically extend from the convex portion of the ceiling plate portion or from the base plate portion of the dust proof plate.

The third dam plate portion has inflow ports located at the part lower than the upper end of the first dam plate portion to form a second annular dust reservoir concave portion between the first dam plate portion and the third dam plate portion.

In the cap according to the present invention, at the time of operation of the negative pressure valve, first, air flows into the cap from the air passage between the shell and the flange portion of the closure.

The air is reversed upwardly after descending, and then turns its direction to a horizontal direction, so that the air passes between the second dam plate portion of the dust proof plate and the convex portion of the ceiling plate portion and flows into a space between the second dam plate portion and the third dam plate portion. At this time, dust mixed in the air collides with the inner circumferential surface of the first dust reservoir concave portion in between the convex portion of the ceiling plate portion and the inner circumferential surface of the cylindrical portion because of both its own weight and inertia, so that the dust is stored in the first dust reservoir concave portion.

Then, the air passes through the inflow ports of the third dam plate portion and flows into a space between the third dam plate portion and the first dam plate portion of the ceiling plate portion.

Moreover, because the inflow ports of the third dam plate portion are located at the part lower than the upper end of the first dam plate portion of the ceiling plate portion, the air changes its direction upwardly so that the air passes between the first dam plate portion and the base plate portion of the dust proof plate and flows into the first dam plate portion. At this time, dust remaining collides with the outer circumferential surface of the first dam plate portion, so that the remaining dust is stored in the second dust reservoir concave portion between the first dam plate portion and the third dam plate portion because of both its own weight and inertia.

After the dust mixed in the air is removed, the air passes through the passage hole of the ceiling plate portion and flows into the negative pressure valve side.

That is, because the cap according to the present invention is formed so that the convex portion is provided in the ceiling plate portion to form the first annular dust reservoir concave portion between the outer circumferential surface of the convex portion and the inner circumferential surface of the cylindrical portion of the closure, a larger capacity for storing dust can be secured to achieve improvement in dust proof durability, in cooperation with the second dust reservoir concave portion.

Further, in the cap according to the present invention, the flow of air flowing into the cap can be positively vertically turned at the convex portion of the ceiling plate portion and at the first, second and third dam plate portions so that the flow of air can be reversed against the direction of action of gravity, particularly at the first dust reservoir concave portion. For this reason, a greater part of dust mixed in the air can be removed at the inside of the first dust reservoir concave portion to achieve improvement in the dust proof effect, in cooperation with the third and second dam plate portions which will be provided thereafter.

In addition, the present invention may be provided with an in-tank pressure control mechanism provided in a body of the cap to be attached to an injection port of the tank, for controlling the inner pressure of the tank by opening/closing an outside-air passage formed in the cap body to make the outside air communicate with the inside of the tank.

The in-tank pressure control mechanism comprises a seal body provided in the cap body and having a seal surface in the periphery of a passage hole forming a part of the outside-air passage; a valve provided so as to be capable of abutting onto or separating from the seal surface of the seal body and having a lip portion capable of abutting on the seal surface to thereby close the passage hole; urging means for continuously urging the valve to abut on the seal surface by an urging force which is larger than the inner pressure of the tank before the inner pressure of the tank reaches an excessive inner pressure requiring pressure control; and limiting means for limiting the divergence of center of the valve with respect to the seal body.

The seal body includes a base portion fixed to the cap body so as to surround the passage hole; and a flat plate portion forming the seal surface on which the lip portion is to abut, and extending from the base portion so as be bent in the direction of urging by the urging force of the urging means acting on the seal surface through the abutment with the lip portion before the inner pressure of the tank reaches the excessive inner pressure.

The in-tank pressure control mechanism according to the present invention gives an urging force larger than the inner pressure of the tank to the valve by the urging means before the inner pressure reaches an excessive inner pressure. The passage hole is closed by bringing the lip portion of the valve in contact with the seal surface. At this time, the flat plate portion is not only bent to the direction of urging by the urging force of the urging means acting on the seal surface through the contact of the lip portion of the valve, but, the divergence of center of the valve with respect to the seal body is limited.

Accordingly, even in the case where various types of defects such as unevenness in thickness, a defect in surface accuracy, and so on, caused by twisting, warping, waving, and so on, may arise in the flat plate portion of the seal body or in the seal surface, the seal surface and the lip portion can be securely brought into close contact with each other on the basis of a uniform force on the entire circumference by making the lip portion touch the seal surface in and the lip portion can be securely brought into close contact with each other on the basis of a uniform force on the entire circumference by making the lip portion touch the seal surface in the state where the flat plate portion is bent. As a result, it is possible to suppress a defect in closing the passage hole due to the aforementioned defects, that is, a sealing defect.

Furthermore, the position where the lip portion is in contact with the seal surface can be set as a regular position within a predetermined range by limiting the divergence of center of the valve with respect to the seal body. As a result, the state where the seal surface and the lip portion are in contact with each other can be easily reproduced.

On the other hand, when the inner pressure reaches an excessive inner pressure, the lip portion of the valve can depart from the seal surface against the urging force of the urging means by the inner pressure to open the passage hole to thereby control the inner pressure of the tank. At this time, the flat plate portion which has received the urging force from the urging means through the contact of the lip portion is now made free from the urging force of the urging means because the lip portion is departed from the seal surface. As a result, the bending of the flat plate portion is canceled.

When pressure control is then completed through elimination of the excessive negative pressure state of the tank, the valve is urged to touch the seal body by the urging force of the urging means to bring the lip portion of the valve in contact with the seal surface in a reproducible manner to thereby close the passage hole again.

BRIEF DESCRIPTION OF THE DRAWINGS

FIG. 10 is an enlarged sectional view showing the periphery of the seal body of the fuel cap of the second embodiment in a closed position.

FIG. 11 is an enlarged sectional view showing the periphery of the seal body of the fuel cap of the second embodiment in an open position permitting outside air to flow into a fuel tank.

DETAILED DESCRIPTION OF THE PRESENTLY PREFERRED EXEMPLARY EMBODIMENTS

Figure 1:
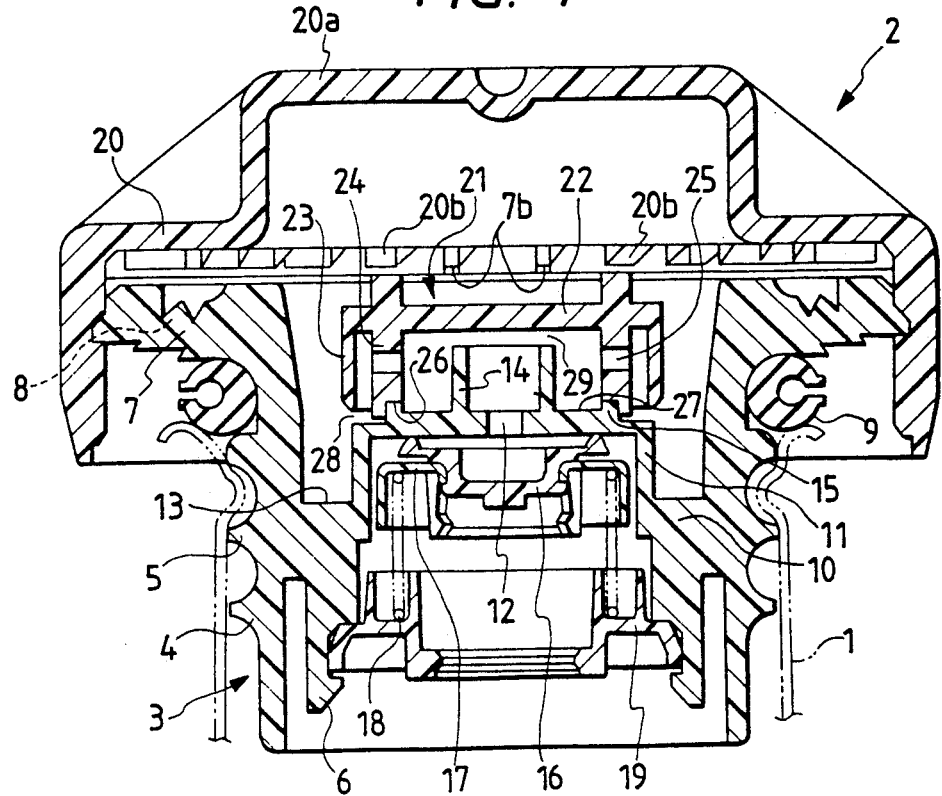
FIG. 1 is a sectional view of a fuel cap of a first embodiment of the present invention.

A first embodiment of the present invention will be described below with reference to the drawings.

In this embodiment, the cap 2, attached to a filler neck opening as supply for a fuel tank of an automobile, as shown in FIG. I, has a closure 3 formed of a synthetic resin such as polyacetal, and a shell 20 formed of a synthetic resin such as Nylon to cover the upper part of the closure 3.

The closure 3 is composed of a cylindrical portion 4 substantially cylindrically shaped, and a ceiling plate portion 10 arranged to block the inner circumference of a substantially vertically middle position of the cylindrical portion and provided with a passage hole 12 at its center.

A screw 5, engageable with the filler neck 1, is formed at the lower outer circumference of the cylindrical portion 4, and a flange portion 7 for locking the shell 20 is formed at the upper outer circumference of the cylindrical portion 4.

Figure 2:
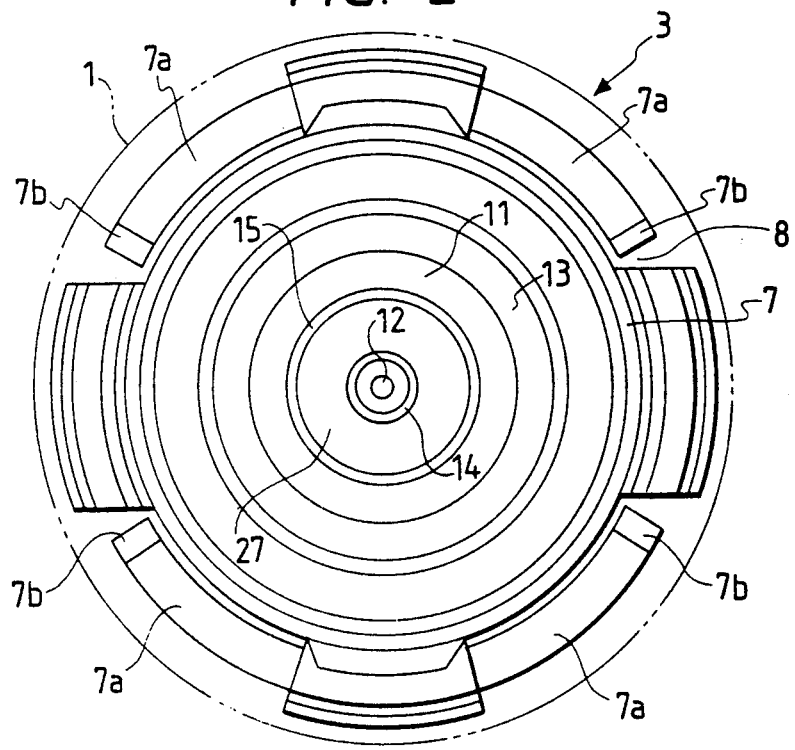
FIG. 2 is a plan view of the fuel cap of FIG. 1.

The flange portion 7, as shown in FIG. 2, has nail portions 7b projecting upwardly at its forward end so that elastic fingers 7a, capable of changing their shapes in the direction of the axis of the closure 3, are formed.

A space between the periphery of the elastic fingers 7a and the shell 20 forms an air passage 8 for making air flow into the cap 2. A seal ring 9 is attached to the lower surface of the flange portion 7.

A large number of ratchet convex portions 20b respectively engaged with the nail portions 7b of the elastic fingers 7a to thereby limit the torque required for tightening the cap 2 to the filler neck 1, are formed at the lower surface of the shell 20. The reference numeral 20a designates a grip portion used for tightening and attaching the cap 2 to the filler neck 1.

A valve body 16, constituting the negative pressure valve, is arranged at the lower surface side of the ceiling plate portion 10 in the cylindrical portion 4. This valve body 16 is held by a valve body holding plate 17 urged upwardly by a coiled spring 18.

The coiled spring 18 has its lower end supported by a spring seat plate 19 fastened to a cylindrical attachment projection 6 formed in the closure 3.

Both the valve body holding plate 17 and the spring seat plate 19 are formed of synthetic resin such as polyacetal. The ceiling plate portion 10 of the cap 2 has a convex portion 11 elevating the periphery of the passage hole 12 upward, so that a first annular dust reservoir concave portion 13 for reserving dust is formed between the outer circumferential surface of the convex portion 11 and the inter circumferential surface of the cylindrical portion 4 (see FIG. 12).

The convex portion 11 has a first cylindrical dam plate portion 14 extending upwardly from the periphery of the passage hole 12. The convex portion 11 further has a cylindrical projecting strip 15 at the outer circumferential edge side of the convex portion 11 between the first dam plate portion 14 and the outer circumferential edge of the convex portion 11 so as to extend upwardly. This projecting strip 15 forms a place where a dust proof plate 21 is fixed.

Figure 3:
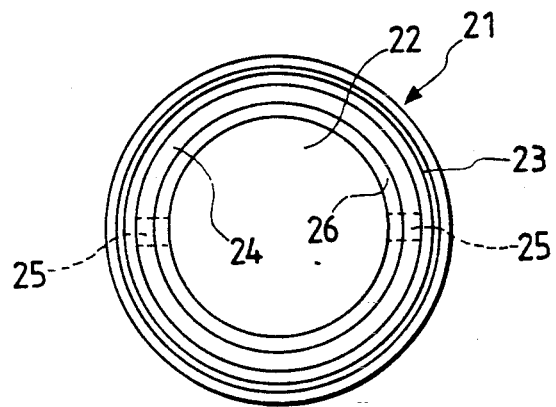
FIG. 3 is a bottom view of a dust proof plate of the fuel cap of FIG. 1.

The dust proof plate 21, covering the periphery of the passage hole 12 at the upper side of the ceiling plate portion 10, is formed of synthetic resin such as polyacetal. This dust proof plate 21, as shown in FIGS. 1 and 3, has a substantially disk-like base plate portion 22 having a diameter substantially equal to the outer diameter of the convex portion 11.

A second cylindrical dam plate portion 23, extending downwardly from the outer circumferential edge of the base plate portion 22 to the outer circumferential edge of the convex portion 11, is formed at the lower surface of the base plate portion 22. Further, a third cylindrical dam plate portion 24 extending downwardly at the inside of the second dam plate portion is formed at the lower surface of the base plate portion 22.

This third dam plate portion 24 has, at the entire circumference of its lower end, a concave groove 26 engaged with the projecting strip 15 of the convex portion 11. This concave groove 26 forms a place where the third dam plate portion 24 is fixed to the convex portion 11 through engagement of the concave groove 26 with the projecting strip 15 by using ultrasonic deposition.

The dust proof plate 21 is formed so that gaps 29 and 28 permitting air to pass are formed between the base plate portion 22 and the first dam plate portion 14 and between the second dam plate portion 23 and the outer circumferential edge of the convex portion 11 after the third dam plate portion 24 is fixed to the convex portion 11.

Further, in the third dam plate portion 24, a plurality of inflow ports 25 are formed (in this embodiment, two at symmetrical positions) at the position lower than the upper end of the first dam plate portion 14 extending from the convex portion 11 when the third dam plate portion 24 is fixed to the convex portion 11.

When the third dam plate portion 24 is fixed to the convex portion 11, a second dust reservoir concave portion 27 for storing dust is formed between the inner circumferential surface of the third dam plate portion 24 where the inflow ports 25 are formed, and the outer circumferential surface of the first dam plate portion 14.

The state where the negative pressure valve operates after the attachment of the cap 2 of this embodiment to the filler neck 1 will be described below.

When the inner pressure of the fuel tank is lowered, the valve body 16 first descends together with the valve body holding plate 17 against the urging force of the coiled spring 18 and departs from the periphery of the passage hole 12 at the lower surface side of the ceiling plate portion 10, so that air flows into the cap 2.

Figure 4:
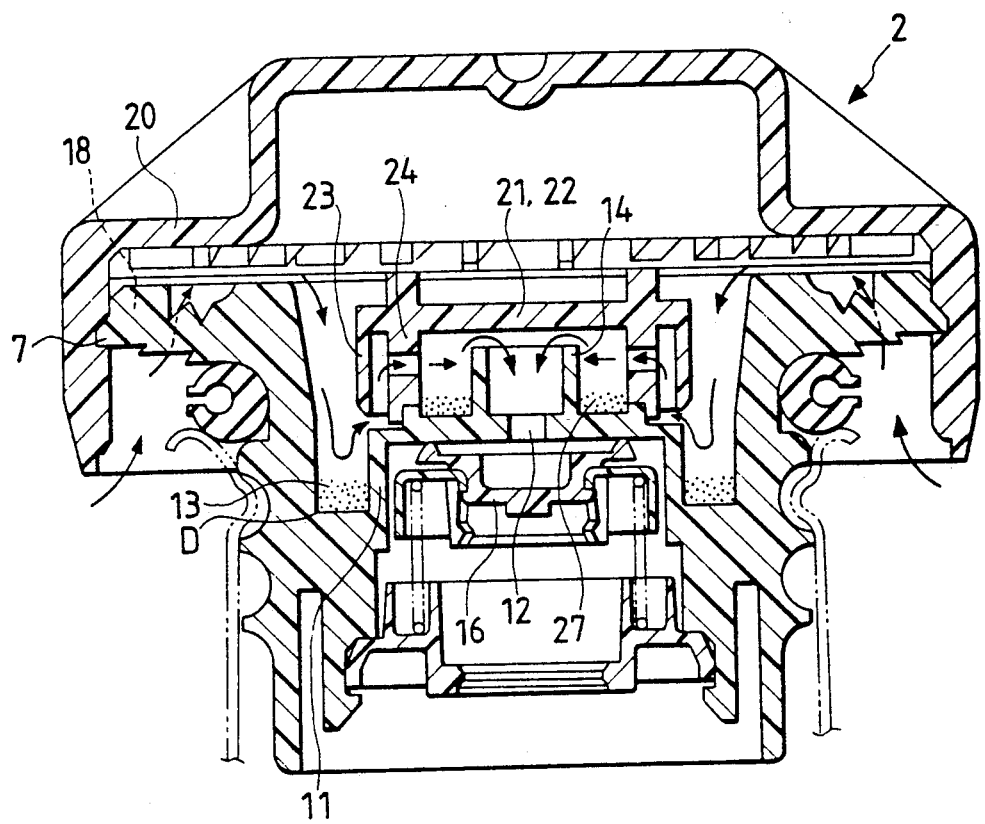
FIG. 4 is a sectional view showing the flow of air at the time of use of the fuel cap of FIG. 1.

At this time, first, as shown in FIGS. 4 and 1, air flows into the cap 2 through the air passage 8 between the shell 20 and the elastic fingers 7a at the flange portion 7 of the closure 7.

The air is reversed upwardly after descending, and then turns its direction to a horizontal direction, so that the air passes through the gap 28 between the second dam plate portion 23 of the dust proof plate 21 and the convex portion 11 of the ceiling plate portion 10 and flows into a space between the second dam plate portion 23 and the third dam plate portion 24. At this time, dust D mixed in the air collides with the inner circumferential surface of the first dust reservoir concave portion 13 in between the outer circumferential surface of the convex portion 11 and the inner circumferential surface of the cylindrical portion 4 because of both its own weight and inertia, so that the dust is stored in the first dust reservoir concave portion 13.

Then, the air passes through the respective inflow ports 25 of the third dam plate portion 24 and flows into a space (second dust reservoir concave portion 27) between the third dam plate portion 24 and the first dam plate portion 14.

Moreover, because the inflow ports 25 of the third dam plate portion 24 is located at the part lower than the upper end of the first dam plate portion 14, the air changes its direction upward so that the air passes through the gap 29 between the first dam plate portion 14 and the base plate portion 22 of the dust proof plate 21 and flows into the first dam plate portion 14. At this time, dust D that has not been removed collides with the outer circumferential surface of the first dam plate portion 14, so that the remaining dust is reserved in the second dust reservoir concave portion 27 between the first dam plate portion 14 and the third dam plate portion 24 because of both its own weight and inertia.

After the dust D mixed in the air is removed, the air passes through the passage hole 12 of the ceiling plate portion 10 and flows into the negative pressure valve side.

Accordingly, because the cap 2 of this embodiment is formed so that the convex portion 11 is provided in the ceiling plate portion 10 to form the first annular dust reservoir concave portion 13 between the outer circumferential surface of the convex portion 11 and the inner circumferential surface of the cylindrical portion 4 of the closure 3, a larger capacity collecting dust can be ensured to achieve improvement in dust-proof durability, in cooperation with the second dust reservoir concave portion 27.

Further, in the cap 2 of this embodiment, the flow of air flowing into the cap 2 can be positively vertically turned at the convex portion 11 of the ceiling plate portion 10 and at the first, second and third dam plate portions 14, 23 and 24 so that the flow of air can be reversed against the direction of action of gravity, particularly at the first dust reservoir concave portion 13. For this reason, a greater part of dust mixed in the air can be removed at the inside of the first dust reservoir concave portion 13 to achieve improvement in the dust proof effect, in cooperation with removal at the third and second dam plate portions which will be provided thereafter. As a result, the same effect as described previously in the paragraph of "Operation and Effect of the Invention" can be achieved.

Although the embodiment has been described wherein the third dam plate portion 24 is formed by extending from the dust proof plate 21, the present invention can be applied to the case where the third dam plate portion 24 may be formed by extending upwardly from the convex portion 11 side of the ceiling plate portion 10.

In addition, a second embodiment of a fuel cap having a negative pressure in-tank pressure control mechanism according to the present invention will be described with reference to the drawings.

Figure 6:
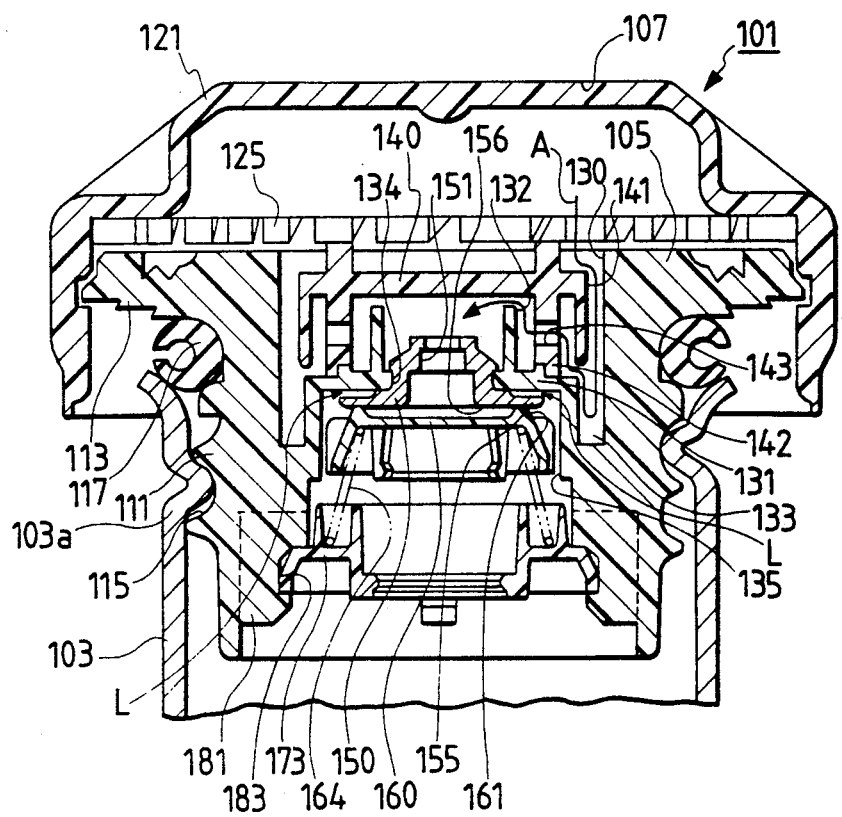
FIG. 6 is a sectional view showing a fuel cap of a second embodiment in which a negative pressure in-tank pressure control mechanism according to the present invention is provided.

In the second embodiment, the fuel cap 101, as shown in FIG. 6 which is a sectional view thereof, is used after it is screwed to a filler neck 103 having an injection port as fuel supply for a fuel tank. This fuel cap 101 has a cap body 105 formed of a synthetic resin material such as polyacetal, and a cover body 107 attached to the upper part of the cap body 105 and formed of a synthetic resin material such as Nylon.

The cap body 105 has a lower body 111 to be screwed to the inner circumferential portion of the filler neck 103. A flange portion 113 for holding the cover body 107 is formed at the upper-part outer circumference of the lower body 111. A screw 115 engageable with a single-threaded screw 103a of the filler neck 103 is provided at the outer circumference of the lower body 111. A seal ring 117 is attached from the outside to the lower surface of the flange portion 113 at the upper end of the screw 115.

The cover body 107, attached to the flange portion 113, has a grip portion 121 at its upper part. A plurality of ratchet convex portions 125 engageable with elastic nail portions (not shown) on the flange portion 113 side are formed at the upper-part rear surface of the cover body 107. The elastic nail portions and the ratchet convex portions 125 are formed so that the cover body 107 rotates idly with respect to the cap body 105 to thereby prevent the fuel cap 101 from being tightening excessively when a larger rotation force in the direction of closing than a predetermined force is applied to the cover body 107, that is, when larger torque than necessary for screwing the fuel cap 101 to the filler neck 103 is applied.

A ceiling hole 130 for forming an outside-air passage is formed at the upper-part center of the lower body 111 of the cap body 105. To the upper surface of a ceiling plate portion 131 which forms the bottom of the ceiling hole 130, a dust proof body 140, formed of a synthetic resin material such as polyacetal in the same manner as the cap body 105, is welded by ultrasonic deposition or the like. The dust proof body 140 has an outer wall 141 facing to the inner circumferential wall of the ceiling hole 130, and an inner wall 142 provided inwardly of the outer wall 141. A lateral hole 143 is formed in the inner wall 142. A buffer wall 132 is erected from the upper surface of the ceiling plate portion 131 so as to face to the lateral hole 143 at the center side of the cap body 105.

Accordingly, an outside-air passage, (arrow A in the drawing) extending from the upper surface of the cap body 105 to the center of the upper surface of the ceiling plate portion 131, is formed by the ceiling hole 130 and the dust proof body 140, so that flowing-in of outside air can be performed through the following route. The outside air at the upper surface of the cap body 105 first passes between the inner wall of the ceiling hole 130 and the outer wall 141, passes between the outer wall 141 and the inner wall 142, passes through the lateral hole 143, flows over the buffer wall 132 and then reaches the center of the upper surface of the ceiling plate portion At this time, a lowermost bottom portion 133 of the ceiling plate portion 130 is formed deeper than the forward end of the outer wall 141 of the dust proof body 140 so that the buffer wall 132 faces to the lateral hole 143. As a result, dirt or dust in the outside air flowing in along the arrow A is stored on the bottom portion of the lowermost bottom portion 133 of the ceiling hole 130 and on the base portion of the buffer wall 132. Accordingly, the outside air after dust removal reaches the center of the upper surface of the ceiling plate portion 131.

Figure 7:
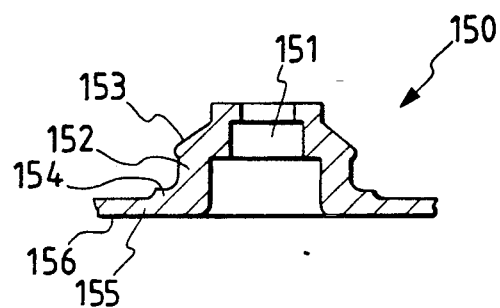
FIG. 7 is an enlarged sectional view of a seal body used in the fuel cap of the second embodiment.

A seal-body press-in hole 134 is formed at the center of the ceiling plate portion 131, so that the seal body 150 is press-fitted and fixed thereto. This seal body 150 is a molding of an elastic material such as fluororubber and has a multi-stage air vent 151 at its center as shown in FIG. 7 which is an enlarged sectional view. The seal body 150 has a thick shell portion 152 at its center, a projection 153 projecting from the shell portion 152 at the upper part thereof, a thick base portion 154 continued from the shell portion 152 at the lower part of the shell portion 152, and a thin flat plate portion 155 continued from the base portion 154.

The shell portion 152 is formed to have a diameter slightly larger than the internal diameter of the seal body fit-in hole 134 and has a thickness slightly smaller than the thickness of the ceiling plate portion 131. Accordingly, when the seal body 150 is press-fitted to the seal body press-in hole 134 from the projection 153 side, the seal body 150 can be fixed into the seal body press-in hole 134 on the basis of the aforementioned size relation without occurrence of any divergence of center and without occurrence of any up/down movement.

The flat plate portion 155 of the seal body 150 is thinner by about 0.5 mm than the thick base portion 154. Accordingly, when the seal body 150 is press-fitted and fixed to the seal body press-in hole 134 in the same manner as described above, a gap L (about 0.5 mm), which is a difference of thickness between the flat plate portion 155 of the seal body 150 and the thick base portion 154 thereof, is formed between the lower surface of the ceiling plate portion 131 and the rear surface of the flat plate portion 155 of the seal body 150 as shown in FIG. 6. That is, because the seal body 150 is a molding of an elastic material, the flat plate portion 155 can be bent to narrow the gap L.

In this seal body 150, the flat surface at the lower end of the flat plate portion, which is sufficiently thin, is used as a seal surface 156 (valve seat) of a valve 160 to thereby constitute a negative pressure in-tank pressure control mechanism of the second embodiment.

At the lower part of the seal body 150, the valve 160 capable of touching or departing from the seal surface 156 which is incorporated in a valve slide hole 135 provided in the lower body 111 so as to be concentric with the seal body press-in hole 134 and at the lower part of the ceiling plate portion 131.

Figure 8:
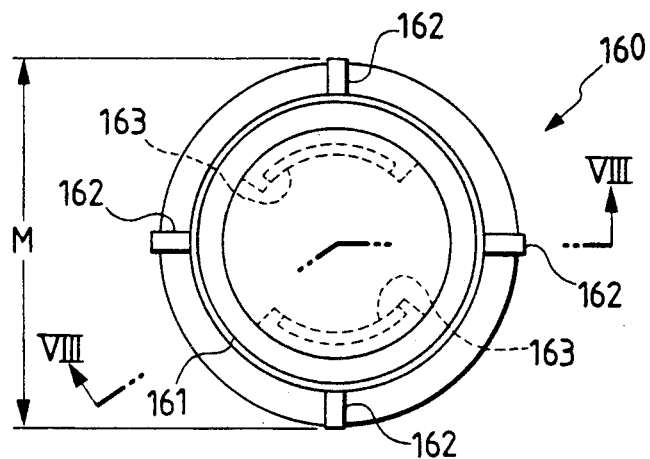
FIG. 8 is an enlarged plan view of a valve used in the fuel cap of the second embodiment.
Figure 9:
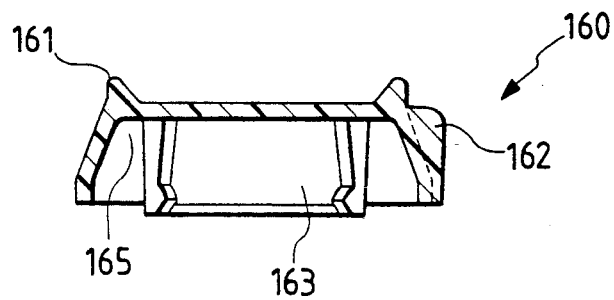
FIG. 9 is a sectional view taken along the line VIII—VIII of FIG. 8.

This valve 160 is shaped like a cup and formed of a synthetic resin material such as polyacetal through injection molding, similarly to the cap body 105. As shown in FIG. 8, which is an enlarged plan view and in FIG. 9, which is a sectional view taken along the line VIII—VIII thereof, the valve 160 has, at its upper surface, an annular lip portion 161 projecting obliquely outward and including a forward end rounded top portion. Accordingly, valve opening and closing operations are performed by means of this lip portion 161.

At the outer circumference thereof, reinforcement ribs 162 for maintaining the shape of the valve 160 are provided at intervals of a pitch of 90 degree. The ribs 162 are respectively formed so that the distance M (see FIG. 8) between the outermost sides of opposite ribs is less than the diameter of the valve slide hole 135 at the lower part of the ceiling plate portion 131 by approximately 0.5 mm. Therefore, the divergence of center of the valve 160 with respect to the valve slide hole 135 is limited within the range of half the difference between the diameter of the valve slide hole 135 and the distance M. Because the valve slide hole 135 is concentric with the seal body press-in hole 134, the divergence of center of the valve is limited also with respect to the seal body 150 press-fitted and fixed to the seal body press-in hole 134. That is, the ribs 162 constitute limiting means in the in-tank pressure control mechanism.

Furthermore, the valve 160 has built up curved pieces arranged opposite to each other, at its inner side. A hollow place at the outside of the curved pieces 163 is used as an upper spring seat 165 for a conical spring 164 which urges the valve 160 toward the seal body 150. The valve 160 and the spring 164 as well as the seal body 150 constitute the negative pressure in-tank pressure control mechanism of the second embodiment.

This valve 160 is continuously urged toward the seal body 150 by the urging force of the spring 164. This spring 164 continuously supplies the valve 160 with the urging force larger than the fuel tank negative pressure but within a range free from pressure control. Accordingly, in the case where the inner pressure of the fuel tank is a negative pressure within a range free from pressure control, the lip portion 161 of the valve 160 comes into contact with the seal surface 156 of the seal body 150 so that the fuel tank is sealed from the outside air. At this time, the flat plate portion 155 of the seal body 150 is bent so that the distance L between the flat plate portion 155 and the lower surface of the ceiling plate portion 131 is narrowed. The quantity of bending of the flat plate portion 155 changes according to the inner pressure of the tank.

As described above, the spring 164 for urging the valve 160 is supported by a spring bearing member 173 at its lower end portion. The spring bearing member 173 is fastened to concave portions 183 of reinforcement ribs 181 which are provided at a plurality of places (4 places) so as to project radially from the inner circumference of the lower portion of the lower body 111. A through-hole 176 is provided at the center of the spring bearing member 173.

In the following, description will be made about controlling of the inner pressure of the tank by the in-tank pressure control mechanism constituted by the seal body 150 and valve 160 pressed-fitted to the ceiling plate portion 131, the spring 164, and so on.

When the fuel cap 101 is in a state where it is attached to the filler neck 103, and when the inner pressure of the fuel tank is negative, the valve 160 receives suction force acting to depart the valve 60 from the seal body 150, corresponding to the negative pressure. The valve 160 is, however, urged toward the seal body 150 by the spring 164. Accordingly, in the case where the fuel tank negative pressure P is a pressure (negative pressure less than a predetermined regulation negative pressure Pr) free from pressure control, the lip portion 161 of the valve 160 comes into contact with the seal surface 156 of the seal body 150 on the basis of the relation between the urging force due to the spring 164 and the suction force due to the inner pressure of the tank, as shown in FIG. 10, which is a partly enlarged view of the periphery of the seal body 150. As a result, the valve is closed so that the fuel tank is sealed from outside air.

Accordingly, even in the case where outside air passes through the ceiling hole 103, the lateral hole 143, and so on, as shown by the arrow A in the drawing, and reaches the seal body 150, the outside air can never enter into the fuel tank.

On the other hand, when the fuel tank negative pressure P increases so as to be larger in the negative pressure side than the predetermined regulation negative pressure Pr (see FIG. 5), the valve 160 moves down against the urging force of the spring 164 because the suction force due to the fuel tank negative pressure P is stronger than the urging force of the spring 164. At this time, the valve 160 moves along the inner wall of the valve slide hole 135 while being guided by the ribs 162. Accordingly, as shown in FIG. 11, which is a partly enlarged view of the periphery of the seal body 150, the lip portion 161 of the valve 160 departs from the seal surface 156 of the seal body 150.

As a result, the outside air, which reaches the seal body 150 as shown in the arrow A in the drawing, successively passes through the air vent 151 of the seal body 150, the gap between the seal surface 156 and the lip portion 161 and the through-hole 176 of the spring bearing member 173, and enters into the fuel tank through the filler neck 103. Accordingly, the excessive negative pressure state of the fuel tank is eliminated. When the excessive negative pressure state of the fuel tank is eliminated, the valve is pushed up toward the seal body 150 by the urging force of the spring 164. Accordingly, the lip portion 161 comes into contact with the seal surface 156 so that the fuel tank is again sealed from the outside air.

As described above, in the in-tank pressure control mechanism in the fuel cap 101 of the second embodiment, in the case where the inner pressure of the tank is a negative pressure within a range free from pressure control, the lip portion 161 of valve 160 comes into contact with the seal surface 156 of the flat plate portion 155 while the flat plate portion 155 of the rubber-made seal body 150 is bent by the urging force of the spring 164 to narrow the gap L between the flat plate portion 155 and the lower surface of the ceiling plate portion 131. As a result, the fuel tank is sealed from the outside air. Furthermore, the divergence of center of the valve 160 with respective to the seal body 150 is limited by the ribs 162 of the valve 160.

Accordingly, even in the case where twisting, warping, and so on, may occur in the flat plate portion 155 of the rubber-made seal body 150 at the time of the molding of the seal body 150 to thereby make the thickness of the flat plate portion 155 uneven to some degree or bring waving and the like in the seal surface 156 of the seal body 150 because the seal body 150 is made from rubber, the following effects can be achieved by the in-tank pressure control mechanism in the fuel cap 101 in this embodiment.

Even in the case where some defect in size or shape occurs in the seal body 150, the flat plate portion 155 is bent so that the lip portion 161 can be brought into contact with the seal surface 156 as described previously. Hence, not only the seal surface 156 and the lip portion 161 can be securely brought into contact or close contact with each other, but, the lip portion 161 can be brought into contact with the seal surface 156 by a uniform force on the entire circumference of the lip portion 161, irrespective of the defect in size and shape. As a result, the defect in size or the like, can be compensated so that sealing characteristic at the time of closing the valve can be improved. Even in the case where the urging force of the spring 164 unbalancedly acts on the valve 160, the unbalance can be absorbed by the bending of the flat plate portion 155. As a result, the unbalance can be compensated so that sealing characteristic at the time of closing the valve can be also improved.

Furthermore, the position where the lip portion 161 is in contact with the seal surface 156 can be set as a predetermined position substantially at a constant distance from the thick portion 154, because the divergence of center of the valve 160 with respect to the seal body 150 is limited. Hence, the contact state between the seal surface 156 and the lip portion 161 and the bending state of the flat plate portion 155 can be easily reproduced. Accordingly, the improved sealing characteristic at the time of closing the valve can be maintained, so that the reliability of sealing can be improved.

Figure 5:
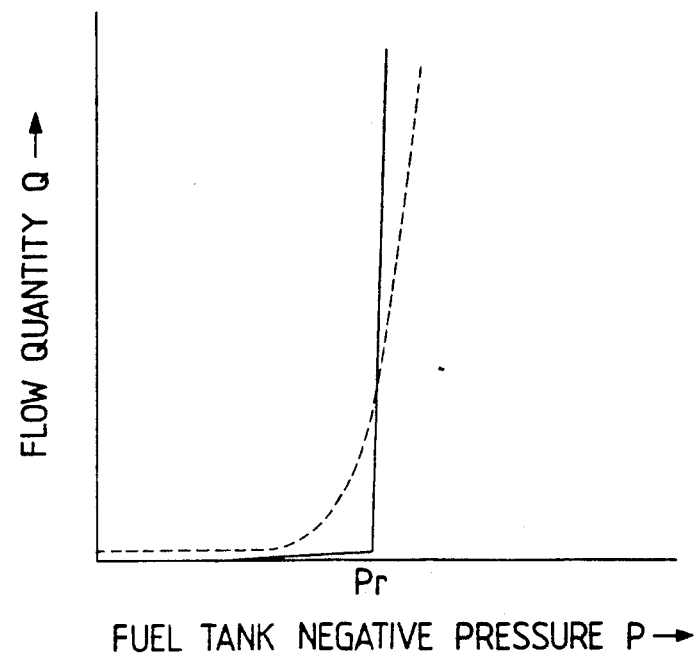
FIG. 5 is a graph showing the relation between fuel tank negative pressure P and flow quantity Q of air passing through the in-tank pressure control mechanism of the invention.

In other words, according to the in-tank pressure control mechanism in the fuel cap 101 in this embodiment, uniformization of the pressure in opening/closing of the valve 160 can be attained through improvement/maintaining of the sealing characteristic at the time of closing the valve. As a result, an in-tank pressure control mechanism having pressure regulating characteristic approximated to the ideal pressure regulating characteristic as shown in FIG. 5 can be provided.

In the fuel cap 101 in this embodiment, the dust proof body 140 is provided so that outside-air can flow into the fuel tank after dust removal. As a result, the fuel in the tank can be prevented from deteriorating.

Although the aforementioned embodiment has been described with reference to a valve for negative pressure, it is to be understood that the present invention is not limited to such a valve but the present invention may be applied to a pressure control valve for positive pressure. In addition, the present invention can be applied to the fuel cap as well as a radiator tank cap.

Although the aforementioned embodiment has been described wherein the ribs 162 constitute limiting means provided to the valve 160 side, the present invention can be applied to the case where projecting strips, instead of the ribs 162, may be provided on the cap body 105 side, that is, on the inner circumferential surface of the valve slide hole 135 of the lower body 111.

As described above, in the in-tank pressure control mechanism according to the present invention, when an urging force stronger than the inner pressure of the tank, before the inner pressure reaches an excessive inner pressure, is given to the valve to thereby achieve contact between the lip portion and the seal surface to thereby block the passage hole, not only the flat plate portion is bent in the direction of urging thereof but the divergence of center of the valve with respective to the seal body is limited.

Accordingly, in the in-tank pressure control mechanism of the present invention, even in the case where various types of defects such as unevenness in thickness, a defect in surface accuracy, or other defects caused by twisting, warping, waving, may arise in the flat plate portion of the seal body or in the seal surface, the seal surface and the lip portion can be securely brought into contact or close contact with each other on the basis of a uniform force on the entire circumference by making the lip portion touch the seal surface in the state where the flat plate portion is bent. As a result, in the in-tank pressure control mechanism of the present invention, a defect in blocking of the passage hole as caused by the aforementioned defects, that is, a defect in sealing, can be suppressed, so that sealing characteristic at the time of closing the valve can be improved.

Furthermore, the position where the lip portion is in contact with the seal surface can be set as a regular position substantially at a constant distance from the base portion by limiting the divergence of center of the valve with respect to the seal body. As a result, the contact state between the seal surface and the lip portion and the bending state of the flat plate portion at the time of the completion of pressure control can be reproduced well. Accordingly, in the in-tank pressure control mechanism of the present invention, the sealing characteristic improved by the bending of the flat plate portion at the time of closing the valve can be maintained, so that reliability on sealing can be improved.

In other words, in the in-tank pressure control mechanism of the present invention, uniformization of the pressure of opening/closing of the valve can be attained through improvement/maintaining of sealing characteristic at the time of closing the valve, so that pressure regulating characteristic approximated to the ideal pressure regulating characteristic, as shown in FIG. 5, can be exhibited.

While the invention has been described in connection with the preferred embodiments, it will be obvious to those skilled in the art that various changes and modifications may be made therein without departing from the principles of the invention, and it is aimed, therefore, to cover in the appended claims all such changes and modifications as fall within the true spirit and scope of the invention.

What is claimed is:

1. A fuel cap comprising:
    a closure including:
    a cylindrical portion with a lower part having means for releasable attachment to a filler neck of a fuel tank,
    a ceiling plate portion having a first hole and being arranged so as to block an inner circumference of said cylindrical portion substantially at a vertically middle position of said cylindrical portion, and
    a flange portion extending outward from an upper part of said cylindrical portion;

a negative pressure valve arranged adjacent to said first hole of said ceiling plate portion so that said valve is actuated to operate when air flows into said cylindrical portion;

a dust proof plate arranged at a periphery of said first hole on an upper side of said ceiling plate portion; and a shell member attached to said flange portion so as to cover an upper part of said closure so that an air passage for said air is formed between said flange portion and said shell member;

said ceiling plate portion having a convex portion enabling the periphery of said first hole to project upwardly and thereby form a first annular dust reservoir between said ceiling plate portion and the inner circumferential surface of said cylindrical portion, and having a first cylindrical dam plate portion extending upwardly from the periphery of said first hole, said dust proof plate having a base plate portion covering an upper part of said convex portion, and including a second cylindrical dam plate portion extending from an outer circumferential edge of said base plate portion to a vicinity of the outer circumferential edge of said convex portion, a third cylindrical dam plate portion being formed between said first dam plate portion and said second dam plate portion so as to vertically extend from one of the convex portions of said ceiling plate portion and the base plate portion of said dust proof plate, said third dam plate portion having inflow ports located at a part lower than an upper end of said first dam plate portion to form a second annular dust reservoir between said first dam plate portion and said third dam plate portion.

2. A fuel cap according to claim 1, wherein said negative pressure valve comprises:

a seal body mounted so that a portion thereof is concentric with said first hole of said ceiling plate portion and having a second hole permitting air to flow into said cylindrical portion, a seal surface being defined in a periphery of said second hole;

a valve member capable of abutting to and separating from said seal surface of said seal body, said valve member having a lip portion capable of abutting on said seal surface to close said second hole; and an urging member for continuously urging said valve to abut on said seal surface by an urging force which is larger than an inner pressure of said tank before said inner pressure reaches an excessive inner pressure requiring pressure control.

3. A fuel cap according to claim 2, wherein said seal body includes:

a base portion fixed to said closure so as to surround said second hole; and a flat plate portion forming said seal surface on which said lip portion abuts, and extending from said base portion so as to be bent in a direction of urging by the urging force of said urging member acting on said seal surface through abutment with said lip portion before the inner pressure of said tank reaches said excessive inner pressure.

4. A fuel cap according to claim 2, wherein said negative pressure valve includes a limiting member for limiting the divergence of a center of said valve with respect to said seal body.

* * * * *